United States Patent
Scrima et al.

(10) Patent No.: US 10,068,684 B2
(45) Date of Patent: Sep. 4, 2018

(54) FIRE RESISTANT CABLE WITH CERAMIFIABLE LAYER

(71) Applicant: PRYSMIAN S.p.A., Milan (IT)

(72) Inventors: Vito Scrima, Milan (IT); Fabio Tosi, Milan (IT)

(73) Assignee: PRYSMIAN S.p.A., Milan (IT)

( * ) Notice: Subject to any disclaimer, the term of this patent is extended or adjusted under 35 U.S.C. 154(b) by 0 days.

(21) Appl. No.: 15/510,078

(22) PCT Filed: Sep. 12, 2014

(86) PCT No.: PCT/IB2014/064474
§ 371 (c)(1),
(2) Date: Mar. 9, 2017

(87) PCT Pub. No.: WO2016/038427
PCT Pub. Date: Mar. 17, 2016

(65) Prior Publication Data
US 2017/0250007 A1 Aug. 31, 2017

(51) Int. Cl.
*G02B 6/44* (2006.01)
*H01B 7/295* (2006.01)
(Continued)

(52) U.S. Cl.
CPC .............. *H01B 7/295* (2013.01); *C08K 3/08* (2013.01); *C08K 3/36* (2013.01); *C08L 23/0853* (2013.01);
(Continued)

(58) Field of Classification Search
CPC ............................. H01B 7/295; G02B 6/4436
See application file for complete search history.

(56) References Cited

U.S. PATENT DOCUMENTS

2005/0205290 A1* 9/2005 Pinacci .................. H01B 7/295
174/121 A
2006/0068201 A1 3/2006 Alexander et al.
(Continued)

FOREIGN PATENT DOCUMENTS

CN 201886815 U 6/2011
DE 197 17 645 A1 10/1998
(Continued)

OTHER PUBLICATIONS

International Search Report and Written Opinion dated Jun. 1, 2015 in PCT/IB2014/064474.
(Continued)

*Primary Examiner* — Omar R Rojas
(74) *Attorney, Agent, or Firm* — Oblon, McClelland, Maier & Neustadt, L.L.P.

(57) ABSTRACT

A fire resistant cable comprising: at least one conducting element; at least one layer, surrounding said conducting element, made of a ceramifiable composition comprising: a polymeric material comprising an ethylene/vinyl acetate copolymer as main polymer; at least 25 wt % of silica; a fluxing agent selected from alkaline metal oxides or precursors thereof; a stabilizing agent comprising at least one of MgO, CaO, PbO, B2O3, or a precursor thereof; from 0.1 wt % to 5 wt % of a hydroxide selected from magnesium hydroxide, aluminum hydroxide and mixtures thereof; the above percentages being expressed with respect to the weight of the ceramifiable composition. Upon exposure to elevated temperatures such as those encountered in case of fire, the ceramifiable composition is transformed into a ceramic material capable of protecting the conducting element from fire and mechanical stresses. The fire resistant cable of the present invention can continue operating under fire conditions for a certain period of time.

20 Claims, 2 Drawing Sheets

(51) Int. Cl.
*C08L 23/08* (2006.01)
*C08K 3/08* (2006.01)
*C08K 3/36* (2006.01)

(52) U.S. Cl.
CPC ........... *G02B 6/443* (2013.01); *G02B 6/4432* (2013.01); *G02B 6/4436* (2013.01); C08K 2003/0818 (2013.01)

(56) References Cited

U.S. PATENT DOCUMENTS

| | | | | |
|---|---|---|---|---|
| 2013/0170800 | A1* | 7/2013 | Consonni | G02B 6/4433 385/100 |
| 2015/0147571 | A1* | 5/2015 | Alexander | H01B 7/295 428/391 |

FOREIGN PATENT DOCUMENTS

| | | |
|---|---|---|
| DE | 10 2005 023 765 A1 | 12/2005 |
| EP | 1 033 725 A1 | 9/2000 |
| ES | 2 415 557 A1 | 7/2013 |
| WO | WO 95/20227 A1 | 7/1995 |
| WO | WO 2012/032370 A1 | 3/2012 |

OTHER PUBLICATIONS

Combined Office Action and Search Report dated Sep. 5, 2017 in Chinese Patent Application No. 201480081848.X (submitting English language translation only).

\* cited by examiner

FIRE RESISTANT CABLE WITH CERAMIFIABLE LAYER

BACKGROUND OF THE INVENTION

The present invention relates to a fire resistant cable. More particularly, the present invention relates to a fire resistant electrical or data cable which is capable of continuing to operate and maintain circuit integrity for a certain period of time when subjected to fire. The cable of the present invention is also resistant to water and mechanical stresses, such as those caused by the water jets used in fire-extinguishing operations.

As known, for example, from CEI EN 50200 and CEI 20-22/2, an electrical or data cable resistant to fire (known as a "fire resistant" cable) is a cable configured so as to be capable of continuing to function with acceptable performance even if, owing to a fire, it is exposed to a direct flame for a period of time, at temperatures of up to 800° C.-900° C. or above.

Fire resistant cables are used for various purposes in the fields of civil constructions and transportation, where they are used, for example, in emergency lightings, alarm and automatic fire detection systems, fire extinguishing systems, automatic emergency exits, lift systems, activation of smoke outlets or shutters, fans, air conditioning, and telephone and video surveillance systems.

In the state of the art, fire resistant cables are known which comprise compositions forming a fire resistant ceramic at elevated temperatures. US 2006068201, for instance, describes electrical cables comprising an insulating layer and/or a sheathing for providing a fire resistant ceramic under fire conditions, the insulating layer and/or sheathing layer comprising:

- at least 15% by weight based on the total weight of the composition of a polymer base composition comprising at least 50% by weight of an organic polymer;
- at least 15% by weight based on the total weight of the composition of a silicate mineral filler, and
- at least one source of fluxing oxide which is optionally present in said silicate mineral filler, wherein after exposure to an elevated temperature experienced under fire conditions, a fluxing oxide is present in an amount of from 1 to 15% by weight of the residue.

The fluxing oxide is likely to be boron oxide or a metal oxide selected from the oxides of potassium and sodium. A precursor of the fluxing oxide can be a metal carbonate precursor to the metal oxides. Zinc borate is a useful precursor for boric oxide. The composition may contain silicon dioxide as a result of being exposed to elevated temperature. Silica may also be added as a separate filler component.

WO 2010/142917 discloses an electrical cable that includes an insulation layer including a first polymer layer surrounding the electric conductor, the first layer being obtained from a first composition including a matrix polymer formed from a thermoplastic polymer, and at least one ceramic-forming charge. The insulation layer further includes a second cross-linked polymer layer surrounding said first layer, the second layer being obtained from a second composition including a matrix polymer containing polyolefins and substantially free from any ceramic-forming charge or halogen compound.

The ceramic-forming charge can be selected from a meltable ceramic charge and a refractory charge or mixture thereof. The meltable ceramic charge can be at least one mineral charge selected from zinc borate. The refractory charge can be at least one mineral charge selected from magnesium oxide, calcium oxide, aluminium oxide, silicon oxide. The second composition can comprise a mineral charge different from that of the first composition, for example magnesium hydroxide or aluminium trioxide. The mineral charge can also be a carbonate. The second composition comprises at least 90 parts by weight of mineral charge for 100 parts by weight of polymer.

WO 2011/112704 relates to insulation and cable jackets with micro oxide particles used with cable and cable components for increasing the flame retardancy. In particular, the insulation material and/or the jacket and/or the bedding include micro oxide particles to form a composite. Preferred oxides include silicon, aluminium, magnesium and their double oxides. Zn and Fe oxides may also be suitable for some embodiments. The micro oxide particles are preferably solid non porous amorphous particles. The micro oxide particles may be added to polyethylene or ethylene vinyl acetate. The concentration of the micro oxide particles may be about 1 to 80% by weight of the insulation, and most preferred about 3-25%. The composite insulation may include alumina trihydrate, magnesium hydroxide, zinc borate.

SUMMARY OF THE INVENTION

Although working in many circumstances, fire resistant cables containing ceramifiable compositions known in the art, on exposure to the elevated temperatures normally encountered in a fire, may lead to the formation of a ceramic layer which is not uniform and coherent due to the formation of cracks or swellings.

The Applicant has thus faced the problem of providing fire resistant cables comprising ceramifiable compositions which upon exposure to fire are transformed into uniform and coherent solid ceramic layers, which are substantially free from cracks and swellings.

Moreover, in order to ensure correct operation, cables must be capable of withstanding intense mechanical stresses, such as vibration, impact, compression and the like, to which they are typically subjected during the fire extinguishing and evacuation operations (e.g. water jets by hydrants).

The Applicant found that in a polymeric composition containing silica as ceramifying agent, the presence of certain stabilizing agent and fluxing agent can provide the formation of char suitable for maintaining the cable in operating condition in the presence of fire and mechanical stress.

In particular, the above problems and others that mill appear more clearly from the following description can be solved by providing a cable with a layer made of a ceramifiable composition comprising an ethylene/vinyl acetate copolymer as base polymer material in which are dispersed at least: an amount greater than 25 wt % of silica, a stabilizing agent selected from at least one of MgO, CaO, PbO, B2O3 or a precursor thereof for providing mechanical stability to the char, a fluxing agent selected from alkali fluxing for accelerating the formation of thermally stable silicon derivatives and a minor amount (not greater than 5 wt %) of a flame-retardant inorganic hydroxide for slowing the burning of the polymeric matrix.

The above ceramifiable composition, upon exposure to elevated temperatures such as those caused by a fire, reacts to form a ceramic layer having excellent fire resistant properties and which is substantially free from cracks and swellings. Moreover, the ceramic layer has a mechanical strength such that the cable can withstand mechanical stresses such as those generated by the impact of water jets from hydrants. The fire resistant layer of the present invention thus effectively protects the conducting element from a fire, allowing the cable to operate and provide circuit integrity in case of a fire for a certain period of time.

Therefore, according to a first aspect, the present invention relates to a fire resistant cable comprising:
- at least one conducting element;
- at least one layer, surrounding said conducting element, made of a ceramifiable composition comprising:
  - a polymeric material comprising an ethylene/vinyl acetate copolymer as main polymer;
  - at least 25 wt % of silica;
  - a fluxing agent selected from alkali metal oxides or a precursor thereof;
  - a stabilizing agent comprising at least one of MgO, CaO, PbO, B2O3, or a precursor of thereof;
  - from 0.1 wt % to 5 wt % of a hydroxide selected from magnesium hydroxide, aluminium hydroxide and mixtures thereof;

the above percentages being expressed with respect to the weight of the ceramifiable composition.

According to a second aspect, the present invention relates to an extrudable ceramifiable composition comprising:
- a polymeric material comprising an ethylene/vinyl acetate copolymer as main polymer;
- at least 25 wt % of silica;
- a fluxing agent selected from alkali metal oxides or a precursor thereof;
- a stabilizing agent comprising at least one of MgO, CaO, PbO; B2O3, or a precursor of thereof;
- from 0.1 wt % to 5 wt % of a hydroxide selected from magnesium hydroxide, aluminium hydroxide and mixtures thereof;

the above percentages being expressed with respect to the weight of the ceramifiable composition.

In accordance with the present invention, by the expression "ceramifiable composition" it is meant an extrudable composition which, when exposed to an intense heating, e.g. such as that produced by a fire, at least partially burns and forms a coherent ceramic material which has a mechanical strength suitable to substantially retain its structural integrity, i.e. the original dimensions obtained after extrusion, even under a mechanical or thermal stress.

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

For the purpose of the present description and of the claims that follow, except where otherwise indicated, the weight percentages of each component that forms the ceramifiable composition are expressed with respect to the weight of the ceramifiable composition.

For the purpose of the present description and of the claims that follow, the amount of each component may be expressed also in terms of "per hundred rubber" (phr), i.e. in terms of parts by weight of the component with respect to the total weight of polymeric material present in the ceramifiable composition.

The fire resistant cable of the present invention can be used for the transportation of electrical energy or data. When the cable of the present invention is an electrical cable, preferably said electrical cable is a cable for the transportation of low-voltage (LV) electrical currents, i.e. electrical currents of voltages equal to or lower than 1 kV. In accordance with the present invention, by the expression "conducting element" it is meant an elongated element having an indefinite length that can be either made of an electrically conductive material, e.g. copper or aluminium or composite thereof, for the transportation of electrical energy or it can be an optical fiber for the transportation of light.

In accordance with the present invention, the conducting element is surrounded by at least one layer comprising a ceramifiable composition (hereinafter referred to also as "ceramifiable layer").

The ethylene/vinyl acetate copolymer of the ceramifiable composition of the invention may be cross-linked.

When the cable of the present invention is a power cable, the ethylene/vinyl acetate copolymer is preferably cross-linked. When the cable of the present invention is a telecommunication cable containing optical fibres as conducting element, the ethylene/vinyl acetate copolymer is preferably not cross-linked.

When the cable of the present invention is a power cable, the ceramifiable layer is preferably used as bedding layer (or interstitial filler) and/or outer sheath.

When the cable of the present invention is a telecommunication cable containing optical fibres as conducting element, the ceramifiable layer is preferably used as cable jacket.

The ceramifiable composition comprises a polymeric material comprising an ethylene/vinyl acetate (EVA) copolymer as main polymer. By "main polymer" it is meant that the said at least one EVA copolymer is present in an amount of at least 60 wt %, preferably greater than 90 wt % with respect to the weight of the polymeric material. Preferably, the amount of said at least one EVA copolymer is up to 100 wt % with respect to the weight of the polymer composition.

In a preferred embodiment, the polymeric material comprises at least two EVA copolymers having different contents of vinyl acetate, as main polymer. The admixture of two different copolymers can improve the processability of the composition, for example in term of rheological properties, and the mechanical features of the extruded product.

Other polymers that can be included in the polymeric material, in amount equal to or lower than 40 wt %, preferably lower than 30% of the weight of the polymeric material, may be selected from polyethylene (PE), in particular low-density PE (LDPE), medium-density PE (MDPE), high-density PE (HDPE) and linear low-density PE (LLDPE); ethylene-propylene elastomeric copolymers (EPM) or ethylene-propylene-diene terpolymers (EPDM); ethylene/[meth]acrylate copolymers; ethylene/α-olefin thermoplastic copolymers; and their copolymers or mechanical blends.

Preferably, the polymeric material is present in the ceramifiable composition in an amount of at least 20 wt %, preferably from 30 wt % to 50 wt % based on the weight of the ceramifiable composition.

The ceramifiable composition of the invention comprises silica (SiO2) in an amount of at least 25 wt % (about 66 phr). Preferably, the amount of silica is from 30 wt % to 60 wt % (about 80 to 160 phr), more preferably from 30 wt % to 50 wt % (80-130 phr). A silica content lower that 25 wt % could result insufficient for providing a composition which is ceramifiable. A silica content greater than 60 wt % could give place to a ceramifiable composition with mechanical properties unsuitable for the use as a cable layer and/or for the manufacturing thereof.

Advantageously, the silica of the ceramifiable composition of the invention is amorphous silica. Preferably, the amorphous silica is a powder material in which the particles have a substantially spherical shape. The use of an amorphous silica made of substantially spherical particles allows the extrusion of ceramifiable composition comprising significant amount of silica (greater than 25 wt %) without increasing the viscosity of the composition to an extent making cumbersome or even impossible the extrusion, at least at an industrially applicable speed.

The median diameter (D50) of the silica spherical particles is preferably within the range 100-200 nm. The specific surface area (as measured by BET method) is preferably within the range 10-30 m2/g. A commercial silica that can be used for carrying out the present invention is sold by Elkem AS (Norway) with the trade name SIDISTAR® R320.

The ceramifiable composition comprises a fluxing agent selected from alkali metal oxides or precursors thereof. Preferably, the fluxing agent is selected from precursors of alkali metal oxides, such as sodium carbonate, potassium carbonate and mixtures thereof, because the alkali metal oxides as such can have a corrosivity and/or reactivity difficult to handle in an industrial plant.

Advantageously, in the ceramifiable composition of the invention the fluxing agent is present in an amount of at least 3 wt %, preferably of at least 5 wt %. Preferably the fluxing agent is present in an amount up to 15 wt %, preferably up to 12 wt %.

The ceramifiable composition comprises a stabilizing agent comprising at least one of MgO, CaO, PbO and B2O3 or a precursor thereof. For example, zinc borate can be used as a source of B2O3 and MgCO3 can be used as source of MgO.

In the ceramifiable composition of the invention the stabilizing agent can comprise a single compound or a mixture of compounds. In an embodiment, the stabilizing agent is a mixture of MgO, CaO, PbO or of precursors of said oxides. Preferably, the stabilizing agent is a mixture of CaO, PbO and MgO or a precursor of MgO. A particularly preferred precursor of MgO is MgCO3.

In another embodiment, the stabilizing agent is a mixture of CaO, PbO or of precursors of said oxides.

In a further embodiment, the stabilizing agent is selected from B2O3 or a precursor thereof. A particularly preferred precursor of B2O3 is zinc borate.

Advantageously, the ceramifiable composition comprises from 5 wt % to 15 wt % of stabilizing agent.

The ceramifiable composition of the present invention comprises from 0.1 to 5% by weight, preferably from 1 to 3.5 wt %, of a hydroxide selected from magnesium hydroxide, aluminium hydroxide and mixtures thereof. Preferably, the hydroxide is aluminium hydroxide.

Without wishing to be bound to any theory to explain the present invention, the Applicant believes that the fluxing agent favors the formation of silicates compounds starting from the silica particles and the oxide particles present in the ceramifiable composition. To this end, the fluxing oxide might have the effect of lowering the melting temperature of the silica thus favoring its reaction with the alkaline metal oxides generated by the fluxing agent. The silicates formed contribute to the formation of the ceramic layer, which is reinforced by the stabilizing agents. The above combination of components lead to the transformation of the ceramifiable composition of the present invention into a coherent ceramic material capable of resisting to the elevated temperatures such as those occurring in case of fire, and withstanding the mechanical stresses, such as those generated by the water jets of the fire-fighting systems. The ceramic layer is also substantially free from visible cracks and swellings.

The ceramifiable composition of the present invention can also include other components, such as lubricants, plasticizers and antioxidants.

Moreover, to improve compatibility between the inorganic filler of the ceramifiable composition and the polymeric material, a coupling agent may be added to the ceramifiable composition. Said coupling agent may be selected e.g. from: saturated silane compounds or silane compounds containing at least one ethylene unsaturation; epoxides containing at least one ethylene unsaturation; organic titanates; mono- or dicarboxylic acids containing at least one ethylene unsaturation, or derivatives thereof such as, for example, anhydrides or esters.

In a preferred embodiment, at least the base polymer of the ceramifiable composition is cross-linked. The cross-linking can be obtained by including in the ceramifiable composition one or more cross-linking agents, preferably peroxide compounds, and possibly co-curing agents, such as triallylcyanurate compounds.

The ceramifiable composition can be prepared by mixing its components with any suitable method known in the art of polymer preparation such as internal mixers, twin screw extruders, kneaders, ribbon blenders and the like.

The manufacturing of the cable according to the present invention can be carried out according to known techniques, particularly by extrusion of a layer of the ceramifiable composition over the conducting element, then, preferably, by cross-linking of such ceramifiable composition.

BRIEF DESCRIPTION OF THE DRAWING

Further characteristics will be apparent from the detailed description given hereinafter with reference to the accompanying drawing, in which.

DETAILED DESCRIPTION OF THE PREFERRED EMBODIMENTS

Figure 1:
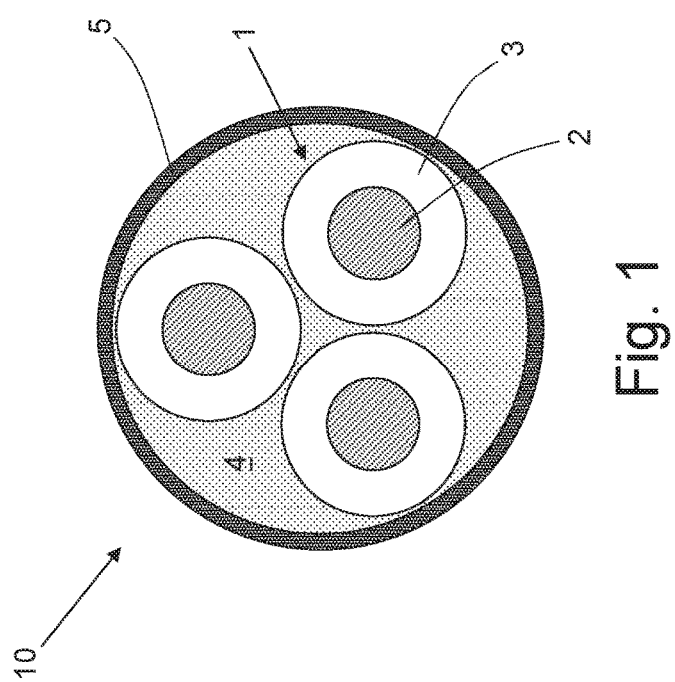
FIG. 1 is a cross section view of a cable according to the invention for power transmission at low voltage.

With reference to FIG. 1, the fire resistant power cable 10 according to the present invention may be of the tripolar type comprising three conducting elements or conductors 2 each covered by an insulating layer 3 to form a core 1. The three conductors 2 with the relevant insulating layers 3 are encircled by an outer sheath 5. The three cores 1 are stranded together forming interstitial zones defined as the spaces between the cores 1 and the cylinder (the outer sheath 5) enveloping such cores. A bedding or interstitial filler 4 fills said interstitial zones.

The insulating constant ki of the electrical insulating layer 3 is such that the required electric insulating properties are compatible with the standards (e.g. IEC 60502 or other equivalent thereto). For instance, the electrical insulating layer 3 has an insulating constant ki equal to or greater than 3.67 MOhm·km at 90° C.

The conductors 2 can be in form of a solid rod or of bundled wires made of electrically conductive metal such as copper or aluminum or composite thereof.

According to a first embodiment, the outer sheath 5 is made of the ceramifiable composition of the present invention.

According to a second embodiment, the bedding 4 is made of the ceramifiable composition of the present invention.

Figure 2:
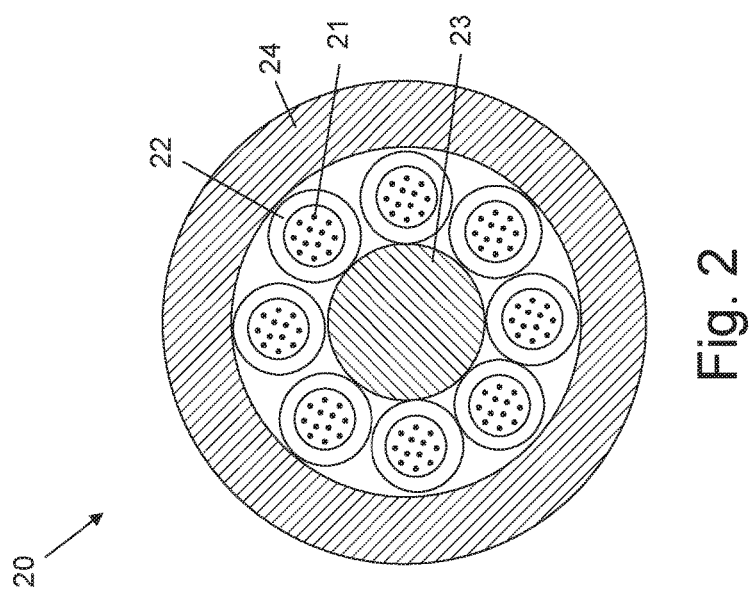
FIG. 2 shows a cross section view of a cable according to the invention for telecommunication.

With reference to FIG. 2, a fire resistant telecommunication cable 20 according to the present invention comprises a plurality of optical fibres 21 grouped and housed into modules 22 in polymeric material, optionally further containing water-blocking material (not shown) in form of gel or filaments. The modules 22 are stranded around a central strength member 23 and a jacket 24 surrounds modules and strength member.

According to an embodiment of the invention, the jacket 24 is made of the ceramifiable composition of the present invention.

The present description shows only some embodiments of a cable according to the invention. Suitable modifications can be made to these embodiments according to specific technical needs and application requirements without departing from the scope of the invention.

The following examples are provided to further illustrate the invention.

Examples

Samples of the ceramifiable composition according to the present invention were prepared by mixing all components in a Banbury internal mixer (volume: 1.6 l; filling factor 80%; speed rotation: 50 rpm; discharge temperature of the compound: 140° C.). Comparative samples 009-011 were also prepared with the same apparatus. The compositions of all samples were prepared by using components and amounts (expressed as wt % with respect to the total weight of the composition) as set forth in Table 1.

TABLE 1

| Ingredients | 002 | 007 | 008 | 009* | 010* | 011* | 012 | 022 | 023 | 024 | 026 | 027 | 030 |
|---|---|---|---|---|---|---|---|---|---|---|---|---|---|
| EVA A | 26.3 | 26.3 | 26.0 | 26.8 | — | 34.0 | 22.2 | 24.5 | 23.7 | 22.9 | 26.3 | 26.3 | 26.8 |
| EVA B | 11.3 | 11.3 | 11.1 | 11.5 | — | 14.6 | 9.5 | 10.5 | 10.1 | 9.8 | 11.3 | 11.3 | 11.5 |
| EBA | — | — | — | — | 37.6 | — | — | — | — | — | — | — | — |
| $SiO_2$ | 41.4 | 41.4 | 40.9 | 42.1 | 41.4 | 24.3 | 50.6 | 45.5 | 47.3 | 49.0 | 41.4 | 41.4 | 42.1 |
| CaO | 3.4 | 3.4 | — | 3.4 | 3.4 | 4.3 | 2.8 | 3.1 | 3.0 | 2.9 | 3.4 | 3.4 | 3.4 |
| PbO | 4.2 | 4.2 | — | 4.2 | 4.2 | 5.4 | 3.5 | 3.9 | 3.7 | 3.6 | 4.2 | 4.2 | 2.4 |
| MgO | 0.6 | 0.6 | — | 0.6 | 0.6 | 0.8 | 0.5 | 0.6 | 0.5 | 0.5 | — | 0.6 | 0.6 |
| $MgCO_3$ | — | — | — | — | — | — | — | — | — | — | 0.6 | — | — |
| Zn borate | — | — | 9.2 | — | — | — | — | — | — | — | — | — | — |
| $Al(OH)_3$ | 1.9 | 1.9 | 1.9 | — | 1.9 | 2.4 | 1.6 | 1.7 | 1.7 | 1.6 | 1.9 | — | 1.9 |
| $Mg(OH)_2$ | — | — | — | — | — | — | — | — | — | — | — | 1.9 | — |
| $Na_2CO_3$ | 7.4 | 7.4 | 7.3 | 7.5 | 7.4 | 9.5 | 6.2 | 6.9 | 6.6 | 6.4 | 7.4 | 7.4 | 7.5 |
| Additives | 3.7 | 3.7 | 3.6 | 3.7 | 3.7 | 4.8 | 3.0 | 3.5 | 3.4 | 3.2 | 3.7 | 3.7 | 3.7 |

EVA A: ethylene vinyl acetate copolymer containing 28 wt % of vinyl acetate with respect to the copolymer weight;
EVA B: ethylene vinyl acetate copolymer containing 45 wt % of vinyl acetate with respect to the copolymer weight;
EBA: ethylene/butyl acrylate copolymer containing 18% by weight of butyl acrylate with respect to the copolymer weight;
SiO2: amorphous silica, BET = 20 m2/g, D50 = 150 nm (Sidistar R 320 TM);
Additives: vinyl tri(2-methoxyethoxy)silane (coupling agent), polydimethylsiloxane (processing aid), pentaerythritol tetrakis (3-(3,5-di-tert-butyl-4-hydroxyphenyl) propionate) (antioxidant), 1,3-1,4-bis(tert-butylperoxyisopropyl)-benzene (cross-linking agent); triallyl cyanurate (curing co-agent).

The compositions marked with an asterisk are comparative examples.

Each composition was made in form of plaques, cross-linked for 15 minutes at 180° C. and then tested. In particular, mechanical properties, i.e. elongation at break (EB—expressed as percentage) and tensile strength (TS—expressed in Mpa) were evaluated on 200×200×1 mm plaques, while the fire-tests were performed on tablets obtained from 150×100×3 mm plaques.

The fire tests were carried out by placing the tablets in a muffle furnace at temperatures of 600° C., 800° C. and 1000° C. The tablets behavior under heating were evaluated by visual inspection and, when cooled down, by mild hammering to assay the char integrity.

The results of the mechanical and fire tests are reported in Table 2.

TABLE 2

| Test | 002 | 007 | 008 | 009* | 010* | 011* | 012 | 022 | 023 | 024 | 026 | 027 | 030 |
|---|---|---|---|---|---|---|---|---|---|---|---|---|---|
| EB (%) | 212 | 186 | 153 | 195 | 136 | 321 | 117 | 193 | 156 | 150 | 217 | 227 | 222 |
| TS (MPa) | 13.4 | 12.9 | 13.0 | 13.3 | 12.9 | 15.0 | 11.2 | 12.2 | 11.9 | 11.1 | 13 | 13.1 | 13.7 |
| Fire test | YES | YES | YES | NO | NO | NO | YES | YES | YES | YES | YES | YES | YES |

EB and TS should be, respectively, greater than 120% and 9.0 MPa, according to IEC 60092-359: SHF2.
A "YES" fire test meant that the sample maintained its integrity and shape with no cracks compromising its mechanical resistance or swellings at temperatures up to 1000° C.

From the experimental data reported in Table 2, it can be seen that the majority of the tested samples had mechanical features according to the standard. The sole sample 012 had an elongation at break slightly below the sought value. The ceramifiable composition of sample 012 can still be used in a fire-resistant cable as interstitial filler (or bedding). The mechanical behavior of sample 012 pointed that amount of silica over 60 wt % could not provide ceramifiable composition suitable for the manufacturing of a power cable.

None of the comparative samples passed the fire test. In particular, sample 009*, not containing any flame retardant hydroxide, swelled and lost its integrity already at 600° C. and resulted totally disaggregated at 1000° C. The same outcome resulted for sample 010* comprising ethylene butyl acrylate (EBA) as main base polymer. Sample 011*, comprising an amount of silica lower than that of the invention (22 wt % vs at least 25 wt %), melted already at 600° C.

The samples of the composition of the present invention resulted substantially unaltered after heating up to 1000° C. or showed only superficial cracks not compromising their integrity.

The invention claimed is:

1. A fire resistant cable comprising:
   at least one conducting element;
   at least one layer, surrounding said conducting element, made of a ceramifiable composition comprising:
      a polymeric material comprising an ethylene/vinyl acetate copolymer as main polymer;
      at least 25 wt % of silica;
      3-15 wt % of at least one fluxing agent selected from alkali metal oxides and precursors thereof;
      5-15 wt % of a stabilizing agent comprising at least one of: MgO, CaO, PbO, B2O3 and precursors thereof;
      0.1 wt % to 5 wt % of a hydroxide compound selected from magnesium hydroxide, aluminium hydroxide and mixtures thereof;
      the above percentages being expressed with respect to the weight of the ceramifiable composition.

2. The fire resistant cable according to claim 1 wherein the polymeric material comprises at least two ethylene/vinyl acetate copolymers having different contents of vinyl acetate as main polymer.

3. The fire resistant cable according to claim 1 wherein the polymeric material is present in an amount of at least 20 wt % with respect to the weight of the ceramifiable composition.

4. The fire resistant cable according to claim 1, wherein the silica is present in an amount of from 30 wt % to 60 wt % based on the weight of the ceramifiable composition.

5. The fire resistant cable according to claim 1, wherein the silica is an amorphous silica made of substantially spherical particles.

6. The fire resistant cable according to claim 1, wherein the fluxing agent is selected from precursors of alkali metal oxides.

7. The fire resistant cable according to claim 1, wherein the fluxing agent is present in an amount of 5-12 wt % with respect to the weight of the ceramifiable composition.

8. The fire resistant cable according to claim 1, wherein the stabilizing agent is a mixture of MgO, CaO and PbO or of precursors of said oxides.

9. The fire resistant cable according to claim 1, wherein the stabilizing agent is a mixture of CaO, PbO and MgO or a precursor of MgO.

10. The fire resistant cable according to claim 1, wherein the stabilizing agent is a mixture of CaO, PbO or of precursors of said oxides.

11. The fire resistant cable according to claim 1, wherein the stabilizing agent is selected from B2O3 or a precursor thereof.

12. The fire resistant cable according to claim 1, wherein the hydroxide is aluminium hydroxide.

13. The fire resistant cable according to claim 1 which is a power cable where the layer made of a ceramifiable composition is a bedding layer and/or an outer sheath.

14. The fire resistant cable according to claim 1, wherein the ethylene/vinyl acetate copolymer is cross-linked.

15. An extrudable ceramifiable composition comprising:
   a polymeric material comprising an ethylene/vinyl acetate copolymer as main polymer;
   at least 25 wt % of silica;
   3-15 wt % of at least one fluxing agent selected from alkali metal oxides and precursors thereof;
   5-15 wt % of a stabilizing agent comprising at least one of: MgO, CaO, PbO, B2O3 and precursors thereof;
   0.1 wt % to 5 wt % of a hydroxide compound selected from magnesium hydroxide, aluminium hydroxide and mixtures thereof;
   the above percentages being expressed with respect to the weight of the ceramifiable composition.

16. The extrudable ceramifiable composition according to claim 15, wherein the stabilizing agent is:
   a mixture of MgO, CaO and PbO or of precursors of said oxides, or
   a mixture of CaO, PbO and MgO or a precursor of MgO, or
   a mixture of CaO, PbO or of precursors of said oxides.

17. The extrudable ceramifiable composition according to claim 15, comprising 30-60 wt % of silica.

18. The fire resistant cable according to claim 1, comprising 30-50 wt % of silica.

19. The fire resistant cable according to claim 1, wherein said at least one conducting element is an optical fiber.

20. The fire resistant cable according to claim 19, comprising plural optical fibers surrounded by a jacket made of said ceramifiable composition.

* * * * *